Oct. 27, 1931.  C. W. POST ET AL  1,829,154
DRIER ROLL POLISHING DEVICE
Filed Nov. 21, 1928   3 Sheets-Sheet 1

Inventors:
Charles W. Post
Ellsworth L. Mount
By
Dana E. Keech
Attorney.

Inventors:
Charles W. Post
Ellsworth L. Mount
By Dana E. Keech
Attorney.

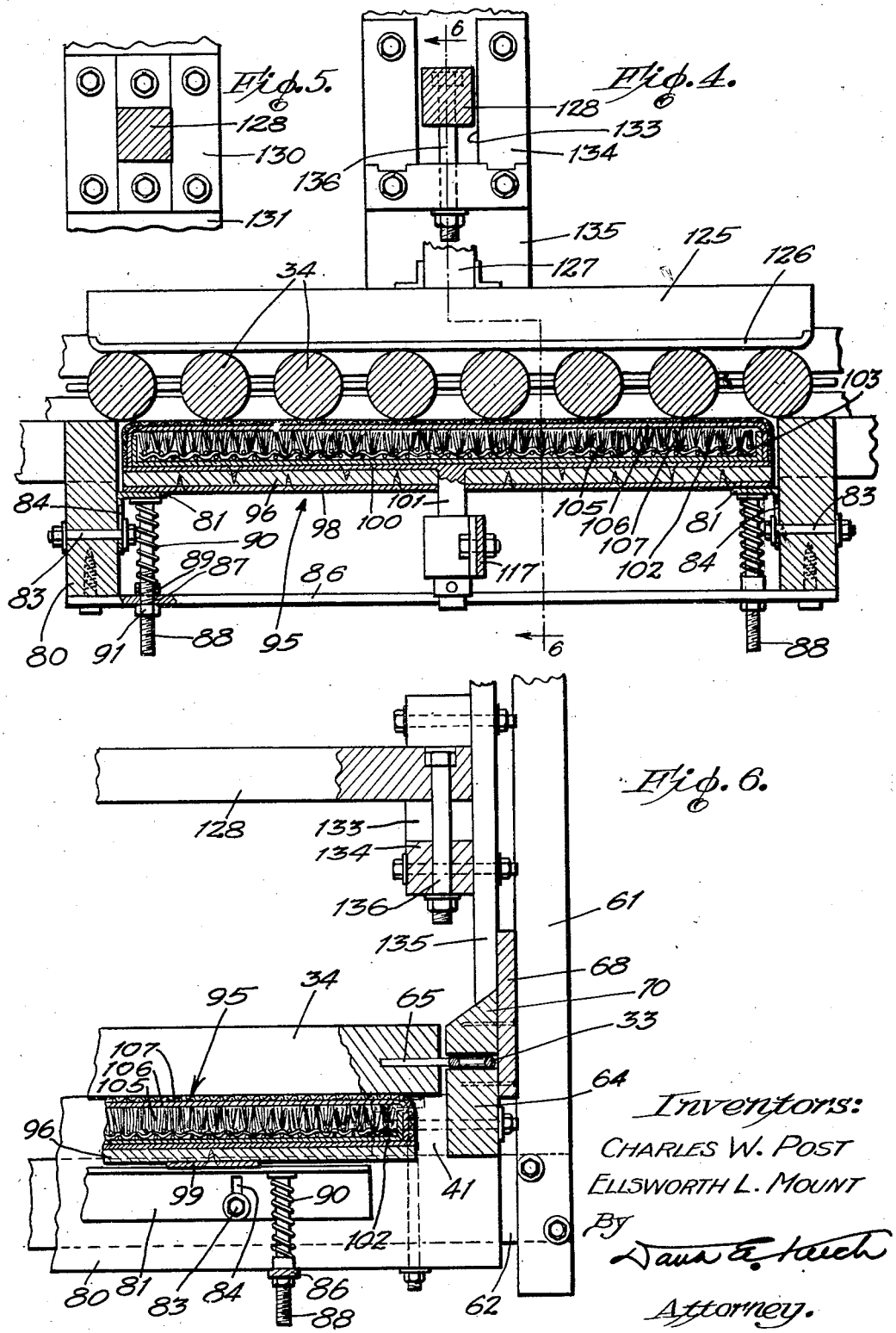

Patented Oct. 27, 1931

1,829,154

UNITED STATES PATENT OFFICE

CHARLES W. POST AND ELLSWORTH L. MOUNT, OF ORANGE, CALIFORNIA

DRIER ROLL POLISHING DEVICE

Application filed November 21, 1928. Serial No. 320,842.

Our invention relates to fruit treating equipment and more particularly to such equipment in which there is a tendency for the fruit to leave a deposit upon the surfaces it touches.

In marketing fresh fruits such as apples, pears, and citrus fruits, the fruit is usually washed and dried by machinery before it is graded according to surface characteristics, sized, and packed into boxes for shipment.

Owing to recent discoveries, it has now become a general practice, in the citrus industry at least, to pass the fruit through a chemical solution after it is washed and before it is dried in order to kill any mold spores on the fruit which might later cause its decay. In spite of efforts to properly rinse off this solution before the fruit passes into the drier, large quantities of solution are carried into the drier by the fruit. As the water in this solution is evaporated, a large portion of the chemical contained therein is of course deposited on the drier.

In the citrus fruit industry in California and Florida, the driers in most common use comprise a horizontal traveling and rotating roller conveyer which carries the fruit beneath fans which blow air downwardly on the fruit and evaporate the moisture from it. In this type of drier the chemical deposited from the solution forms rough projections upon the surfaces of these rollers. As the fruit rests upon and is continuously rotated by these rollers for a half hour or more while it is being dried, the projections thus formed on the rollers are pressed against the fruit many times and in many instances puncturing of the oil cells of the rind of the fruit results. This of course makes subsequent infection of the fruit with mold spores easy and has been found to materially increase the percentage of decayed fruit in shipments transported to distant points.

It is therefore an object of our invention to provide an apparatus for effectively preventing an accumulation of deposit upon citrus fruit drier rolls which would be detrimental to fruit carried thereon.

In certain citrus packing houses it has been the custom in the past to periodically remove the rolls from the drier and scrub these to remove accumulated deposits therefrom.

It is a further object of our invention to provide an apparatus for cleaning deposited material from citrus fruit drier rolls without removing said rolls from the drier.

Further objects and advantages will be made manifest in the following description and in the accompanying drawings, in which:

Fig. 4 is a fragmentary vertical sectional view taken on the line 4—4 of Fig. 3.

Fig. 5 is a fragmentary view on the same scale as Fig. 4 illustrating how one end of the pressure bar of our invention is fixed upon the frame of a drier.

Fig. 6 is a fragmentary enlarged sectional view taken on the line 6—6 of Fig. 4.

Figure 1:
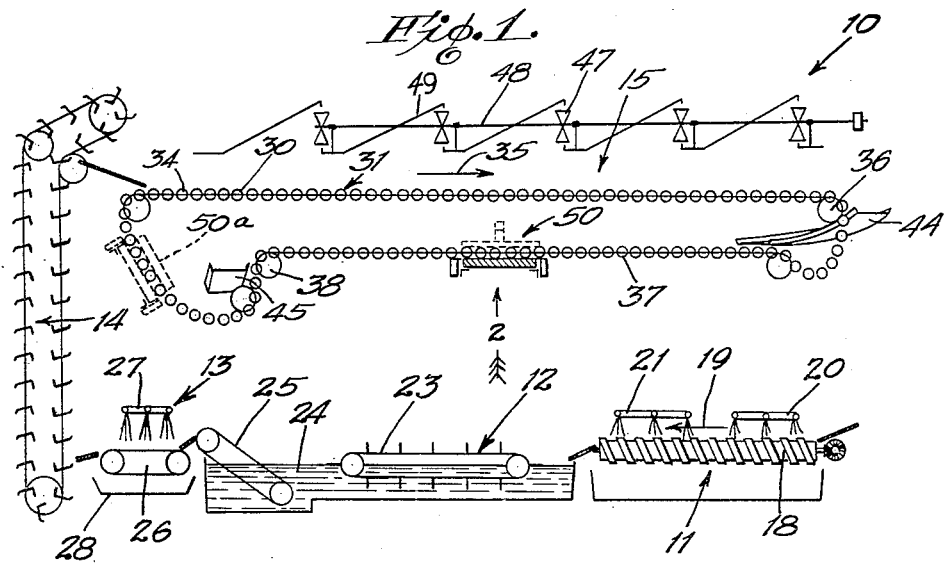
Fig. 1 is the diagrammatic representation of a citrus fruit washing and drying apparatus with which our invention is adapted to be associated.

Referring specifically to the drawings, an apparatus 10 is shown in Fig. 1, particularly adapted to washing, chemically treating and drying oranges and grapefruit. The apparatus 10 includes a washer 11, a solution tank 12, a rinser 13, a loose fruit elevator 14 and a roller drier 15. Although this apparatus is suitable for handling several different citrus fruits, in the following description we will consider it when used in the packing of oranges.

The washer 11 is provided with rotating brushes 18 having their surfaces suitably threaded so that fruit resting between the brushes is carried in the direction of the arrow 19 from one end to the other of the brushes, the surfaces of the fruit being scrubbed clean by these brushes during this passage. Disposed above the brushes 18 are spray manifolds 20 and 21 which spray soap solution and rinse water respectively over the oranges as they travel along the brushes 18.

The solution tank 12 has a submerger 23 which comprises a slatted belt, the lower flight of which is submerged in a body of treating solution 24. Mounted in the far end of the solution tank 12 is an inclined conveyer 25 for removing oranges from the tank 12.

Oranges leaving the washer 11 drop into the right hand end of the solution 24 and are carried through the solution to the left hand end of the treating tank 12 where they are lifted from the solution by the conveyer 25 and deposited upon a horizontal conveyer 26 of the rinser 13. Positioned above the conveyer 26 is a spray manifold 27 which continuously discharges a spray of fresh water onto the oranges carried on the conveyer 26. This spray as it drips from the conveyer 26 is collected in a drain pan 28 and disposed of in some way so that the chemical carried in it may not injure any vegetation.

After passing through the rinser 13 the oranges enter buckets of the loose fruit elevator 14 and are lifted upwardly and discharged onto the left hand end of the upper flight 30 of a roller conveyer 31 of the drier 15. The conveyer 31 includes a pair of endless chains 32 and 33 between which suitable wooden rollers 34 are pivotally mounted in a manner to be described later. The upper flight 30 of the conveyer 31 is drawn in the direction of the arrow 35 by suitable sprockets 36 with which the chains 32 and 33 of the conveyer 31 mesh. Lying beneath the upper flight 30 of the conveyer 31 is a lower flight 37 thereof, which is drawn in the opposite direction from the arrow 35 by suitable sprockets 38 meshing with the chains 32 and 33.

The opposite ends of the rollers 34 in both of the flights 30 and 37 are supported on suitable tracks 40 and 41. As the rollers 34 travel, therefore, they turn so as to continuously rotate oranges carried upon them. Fruit deposited on the left end of the upper flight 30 after being carried the length of this flight is discharged from the right hand end of the flight 30 by any suitable means, such as a chute 44, onto the right hand end of the lower flight 37. This fruit is of course carried by the flight 37 to its opposite end where it is discharged onto any suitable conveying means such as a chute 45.

Provided above the upper flight 30 of the conveyer 31 is a series of fans 47 mounted upon and operated by a shaft 48, the draft in these fans being directed downwardly by a suitable housing 49 upon the oranges carried by the conveyer 31.

The apparatus 10 has been illustrated and described for the purpose of making clear the difficulties which are being met at present in the citrus industry in California owing to the inevitable transfer of chemical from the body of solution 24 to the outer surface of the rollers 34.

There are several reasons for failure of the apparatus in present use to prevent this transfer. Principal among these is the limitation of the amount of water which can be used in the rinser 13. This results from, first, the cost of the water, and second, the limited facilities for disposing of this water so that the chemical carried in it will not have the opportunity to injure vegetation. Thus, while the strength of solution on the oranges is considerably reduced by the rinse water, it is not entirely removed. This small remaining amount of chemical is carried into the drier 15 by each orange of the twelve hundred to two thousand boxes which pass through the drier in an average day's run. The aggregate amount of chemical thus transferred to the rollers 34 is sufficient, in only a few days run, to build up deposits of irregular shapes presenting sharp edges which do considerable damage to the fruit passing through the drier.

Packing house managers generally are aware of the damaging effect of this deposit but the expense of taking the rolls out of the drier and cleaning them tempts many managers to let the cleaning of the rollers go longer than is good for the fruit.

In order, therefore, to prevent the building up of chemical deposits on drier rollers into shapes which damage the fruit and in order to inexpensively accomplish the removal of these deposits from drier rollers, we have provided a roller polisher 50, the position of which is diagrammatically illustrated in Fig. 1 and which may be described in detail as follows:

The drier 15, the construction of which is well known in the art, is usually suspended from the rafters of a packing house as by rows of uprights 60 and 61 disposed along opposite sides of the drier. Extending horizontally and connecting lower ends of opposite uprights 60 and 61 are support bars 62. Resting on these bars are longitudinal chain tracks 63 and 64. The roller tracks 40 and 41 upon which the lower flight 37 of the conveyer 31 travels are secured to the inner faces of the chain tracks 63 and 64 and also rest upon said bars 62.

The rollers 34 are spaced so that the centers of adjacent pairs are separated a distance equal to the length of two links of the chains 32 and 33. Every other link of these chains is what is known as a lug link and has a lug 65, each of which extends into a hole provided axially in an end of one of the rollers 34. The rollers 34 are thus drawn along the tracks 40 and 41 by the lugs 65. Secured to the outer faces of the chain tracks 63 and 64 are horizontally disposed boards 67 and 68 which lie between said tracks and the uprights 60 and 61. Secured to inner faces of the boards 67 and 68 are molding strips 69 and 70 which fill the space between the chains 32 and 33 and the tops of the rollers 34.

Extending along the drier 15 outside of the uprights 60 is a drive shaft 75 which is connected with any suitable source of power and which is supported on the uprights 60 by suitable bearings 76. This shaft 75 is standard equipment on driers of this type for driving the sprockets 36 and 38.

The roller polisher 50 has two main supporting beams 80 which extend transversely of the drier beneath the tracks 40 and 41 and which are secured by suitable bolts to these tracks. The upper edges of these beams are substantially on a level with the upper faces of the roller tracks 40 and 41 and the ends of these beams are notched to receive the tracks 40 and 62 at one end, and 41 and 63 at the other. The roller tracks 40 and 41 are cut away between the beams 80.

Disposed against inner faces of the beams 80 are polisher tracks 81 which are formed of angle iron and which are held in place by bolts 83 which pass through slots 84 formed in the vertical legs of the tracks 81. Secured to lower faces of beams 80 adjacent to opposite ends of the polisher tracks 81 are bars 86; each of which has a suitable opening 87 disposed beneath each of the tracks 81. Extending through the holes 87 and having their heads welded or otherwise suitably secured to horizontal legs of the tracks 81 immediately thereabove, are bolts 88. Disposed about each of the bolts 88 between the adjacent polisher track 81 and bar 86 is a tubular collar 89 and a compression spring 90 so that the springs 90 urge the tracks 81 upward to the limit of the play permitted by the slots 84. In order to adjust the upwardmost position of the tracks 81, nuts 91 are screwed onto the lower ends of the bolts 88 and turned up against the bars 86.

Slidably resting on the polisher tracks 81 is a polisher pad 95. The pad 95 has a base board 96, on the bottom of which are screwed three transverse brace and wear plates 97, 98, and 99. Countersunk into the upper face of the board 96 exactly opposite the wear plate 98, is a pin mounting plate 100 having a crank pin 101 welded to a central point thereof so that this pin extends downwardly through suitable holes in the base board 96 and the wear plate 98. Secured in any suitable manner to the upper face of the base board 96 and substantially covering this board is a shallow metalic pan 102 having side and end walls 103. Resting in the pan 102 is a cocoa mat 105, the bristles of which extend up above the upper edges of the walls 103. Covering the cocoa mat 105 is one or more thicknesses of felt 106 and one or more thicknesses of terry cloth 107, the edges of which are drawn snugly over the pan walls 103 and secured in any suitable manner to this pan or to the base board 96. As it may be noted in Fig. 4, the upper surface of the terry cloth is substantially on a level with the upper edges of the polisher beams 80 so that the rollers 34 traveling over this pad normally contact with the terry cloth.

Figure 7:
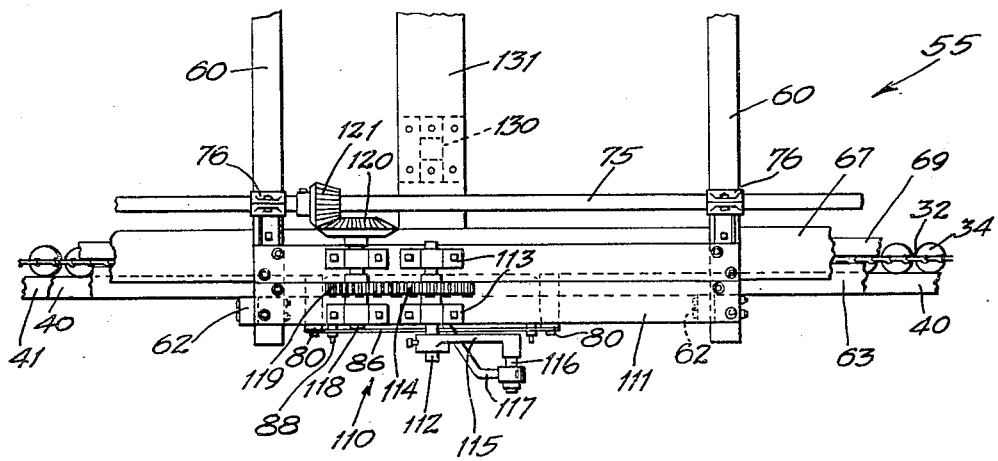
Fig. 7 is an elevational view taken in the direction of the arrow 7 in Fig. 3.
Figure 2:
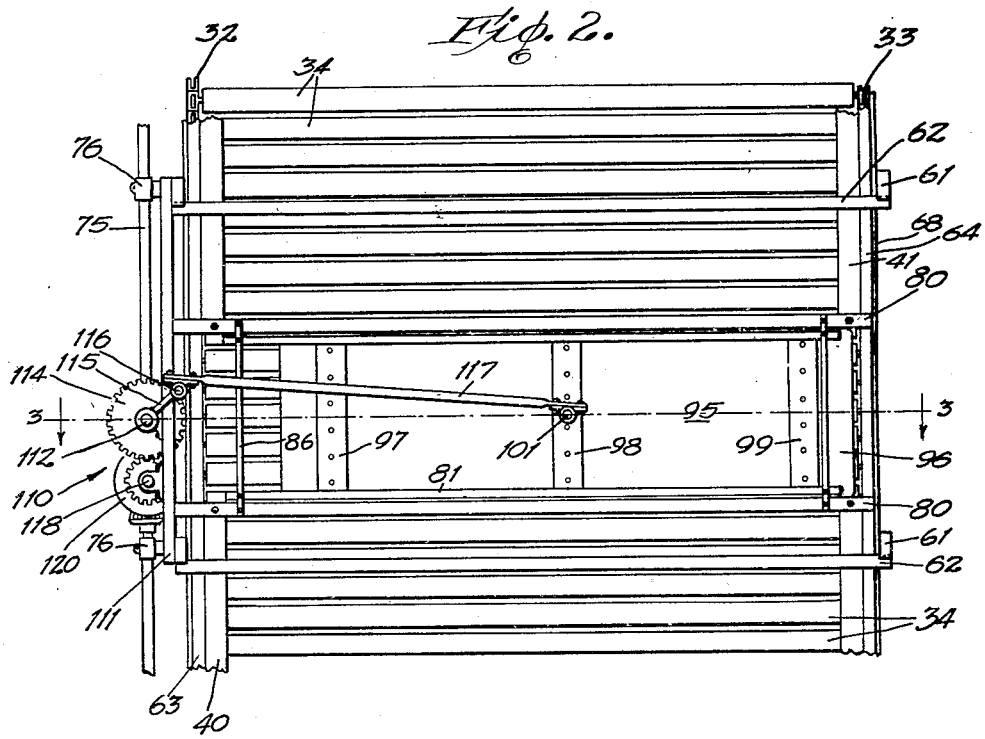
Fig. 2 is a bottom plan view of a preferred embodiment of the roller polisher of our invention taken in the direction of the arrow 2 in Fig. 1.
Figure 3:
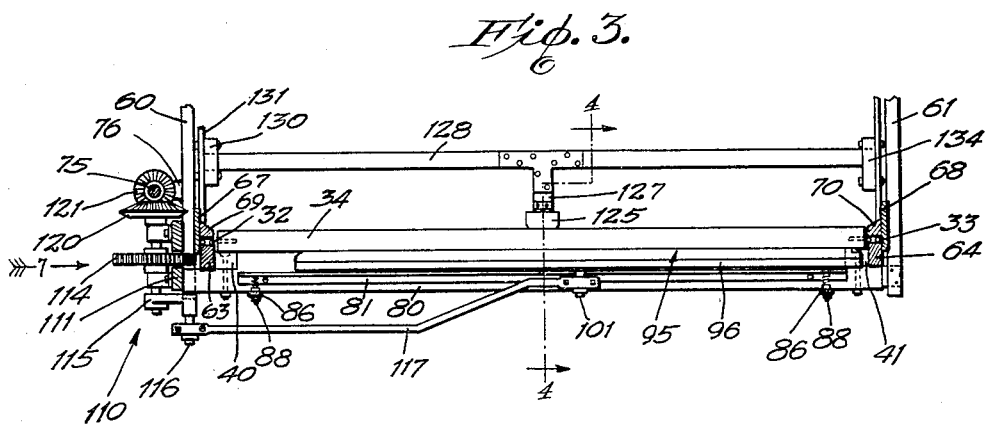
Fig. 3 is a transverse vertical sectional view taken on the line 3—3 of Fig. 2.

In order to reciprocate the pad 95 on the polisher tracks 81, a simple gear and crank mechanism 110 is provided which is illustrated in Figs. 2, 3, and 7. This mechanism is mounted upon boards 111 which are bolted to lower portions of a pair of the uprights 60 disposed on opposite sides of the polisher beams 80. This mechanism includes a vertical shaft 112 mounted in bearings 113 secured to the boards 111, and having a gear wheel 114 mounted thereon between bearings 113 and a crank arm 115, mounted thereon below said bearings. The crank arm 115 has a crank pin 116 which is connected to the crank pin 101 by a suitable pitman.

Also mounted in suitable bearings secured to the boards 111 is a vertical shaft 118 having a pinion gear 119 which meshes with the gear 114. The upper end of the shaft 118 has a large bevel gear 120 which meshes with a bevel pinion 121 secured upon the shaft 75. When the bevel pinion 121 is made fast to the shaft 75 and this shaft is rotated the pad 95 is continuously reciprocated from one extreme position adjacent the chain track 63 to its other extreme position adjacent the chain track 64. In this movement the terry cloth wipes against the rollers 34.

In order for this wiping action to be sufficiently vigorous to be effective for the desired purpose, a shoe 125 having a rubber facing 126 is removably mounted within the drier so as to bear downwardly against the rollers 34 when these are in contact with the pad 95. The shoe 125 is connected by a short strut 127 to the center portion of a pressure bar 128, one end of which fits into a socket member 130 provided on an upright 131 which is connected in any suitable manner to the frame of the drier 15. The other end of the pressure bar 128 is adapted to be dropped downwardly into a cavity 133 of a socket 134 mounted on a board 135 vertically secured to the frame of the drier 15 in any desired manner. Extending through one end of the pressure bar 128 and a portion of the socket 134 is a bolt 136 by which this end of the pressure bar may be drawn downwardly to vary the pressure exerted upon the rollers 34 by the pressure shoe 125.

The operation of our invention is as follows:

During the normal operation of the drier 15 the bevel pinion 121 is allowed to idle on the shaft 75 and the pressure shoe 125 and bar 128 are entirely removed from the drier. Thus the rollers 34 roll over the pad 95 without having any particular effect upon the rollers. It is generally necessary to clean the rollers 34 about once every two days and this is done when there is no fruit in the drier. We have found that a convenient time for cleaning the rollers is at night when a night watchman is always on duty in every packing house and can be entrusted with this task. To polish the rollers by the polisher 50, the bevel pinion 121 is securely fastened to the shaft 75 and the pressure bar 128 carrying the shoe 125 is placed inside the drier as shown in the drawings and the bolt 136 is tightened so that the shoe 125 forces the rollers 34 into snug contact with the upper surface of the pad 95.

In order to clean off certain chemicals from the rollers 34 we have found a solvent is very helpful. For example, where the chemical used in the solution 24 is sodium bicarbonate we have used kerosene with great success as a solvent. To assist the polishing of the rollers of the average size drier, about six quarts of kerosene is poured over the pad 95 so that this seeps down through the terry cloth and felt into the pan 102 and saturates the cocoa mat 105. Power is now applied to the shaft 75 which sets the drier 15 in operation, and also causes the mechanism 110 to reciprocate the pad 95 while pressed hard against the rollers 34 by the shoe 125.

The solvent in the pad 95 is of course applied to the rollers 34 as they are rubbed by the pad 95 and the chemical deposited upon the rollers is removed by the pad, leaving the rollers smooth and with a bright polish. If the polishing of the rollers in the manner above described is done every two or three days it can be satisfactorily accomplished by running the drier with the polisher in operation long enough so that the entire conveyer 31 contacts the pad 95 at least once. Where the rollers are very dirty, however, it may be necessary to run the entire conveyer through the polisher two or even three times in order to satisfactorily remove the chemical adhering to the rolls.

A single circuit of the roller conveyer 31 usually requires about half an hour. It is quite an advantage therefore that our roller polisher will accomplish its work without any further attention after it has been once set into operation.

Although we show and describe but a single preferred embodiment of our invention, it is to be understood that various modifications may be made in this embodiment without departing from the spirit of the invention or the scope of the appended claims. For instance, it is not essential that the roller polisher 50 be mounted to operate upon the lower conveyer flight 37 as above described, but might equally well be mounted as indicated by the dotted lines 50a in Fig. 1. When thus mounted, the polisher 50 could be allowed to operate continuously upon the rollers 34 at a much less pressure that is applied when the polisher is used only once every few days. Continuous operation would be made possible owing to the fact that when in the position 50a the pressure shoe 125 of the polisher 50 would not be in the way of fruit passing through the drier 15 and could therefore be permitted to remain in position to contact the rollers 34 while the drier is in use.

We claim as our invention:

1. In combination with a fruit drier in which the fruit is carried upon a roller conveyer while being dried, of: a pad mounted to contact the rolls of said conveyer; means for reciprocating said pad axially with respect to said rolls; and means for supplying a solvent to said pad during said reciprocation.

2. In combination with a fruit drier in which the fruit is carried upon a roller conveyer while being dried, of: a pad mounted to contact the rolls of said conveyer; means for reciprocating said pad axially with respect to said rolls; and means for pressing said rolls against said pad during said reciprocation.

3. In combination with a fruit drier in which the fruit is carried upon a roller conveyer while being dried, of: polishing means contacting the rolls of said conveyer; means for operating said polishing means; and means for pressing said rolls against said polishing means.

4. In combination with a fruit drier in which the fruit is carried upon a roller conveyer while being dried, of: laterally reciprocating polishing means contacting the rolls of said conveyer; means for operating said polishing means; and means for causing said rolls to rotate in non-rolling relation with said polishing means while in contact therewith.

5. In combination with a fruit drier in which the fruit is carried upon a roller conveyer while being dried, of: laterally reciprocating polishing means contacting the rolls of said conveyer; means for operating said polishing means; and means for pressing said rolls against said polishing means.

6. In combination with a roller fruit drier, a roll polishing device comprising: a slideway provided adjacent a path over which said rollers travel; a pad reciprocably disposed on said slideway so as to contact said rollers; means to reciprocate said pad; and means for retaining a supply of liquid in said pad during said reciprocation.

7. In a device for polishing the rolls of a traveling rotating roller conveyer, the combination of: means for polishing said rollers as they pass a given point; and means engaging said rollers, opposite the place where said polishing means is applied, for causing a reverse rotation of said rollers from that which they would take in a rolling contact with said polishing means.

8. In a device for polishing the rolls of a traveling rotating roller conveyer, the combination of: means for polishing said rollers as they pass a given point; and means frictionally contacting said rollers, opposite the place where said polishing means is applied, for causing a reverse rotation of said rollers from that which they would take in a rolling contact with said polishing means.

9. A combination as in claim 7 in which said polishing means moves crosswise of said conveyer during the reverse rotation of said rollers.

10. A combination as in claim 7 in which said polishing means reciprocates crosswise of said conveyer during the reverse rotation of said rollers.

In testimony whereof we have hereunto set our hands at Los Angeles, California, this 14th day of November, 1928.

CHARLES W. POST.
ELLSWORTH L. MOUNT.